May 8, 1962 J. E. COX 3,033,940

OPERATOR TELEPHONE CIRCUIT

Filed Sept. 9, 1960 3 Sheets-Sheet 1

INVENTOR.
J. E. COX

BY [signature]

ATTORNEY

OPERATOR TELEPHONE CIRCUIT

Filed Sept. 9, 1960

INVENTOR.
J. E. COX
BY
ATTORNEY

May 8, 1962 J. E. COX 3,033,940

OPERATOR TELEPHONE CIRCUIT

Filed Sept. 9, 1960 3 Sheets-Sheet 3

INVENTOR.
J.E. COX
BY [signature]
ATTORNEY

United States Patent Office 3,033,940

Patented May 8, 1962

3,033,940

OPERATOR TELEPHONE CIRCUIT

John E. Cox, Passaic, N.J., assignor to International Telephone and Telegraph Corporation, New York, N.Y., a corporation of Maryland Filed Sept. 9, 1960, Ser. No. 54,913
18 Claims. (Cl. 179—51)

This invention relates to telephone switchboards and more particularly to operator telephone circuits especially adapted for use in connection with such switchboards.

Since its invention, telephone communication has grown from a point where intelligible conversation over restricted distances was adequate to a point where even undistorted conversation over great distances is not adequate. Today, it is also necessary to provide for the transmission of many complex signals other than voice currents. This phenomenal growth of the art is primarily a result of improved equipment and techniques. However, this growth has also brought problems, one of which is the obsolescence of industry standards that results from these improvements. For example, in the days of open-line wire transmission, equipment was designed around the 600 ohm impedance of the telephone lines; however, today the lines, components, and the like are more appropriately designed to have a 900 ohm impedance. An example of the changing techniques is found in the accelerated trend away from two line transmission toward four line transmission (i.e. modern design calls for greater use of one-way transmit and receive channels instead of a common two-way channel). In addition, to these general problems, there are other specific problems which must be overcome. For example, the present day operator circuits suffer from poor, low frequently return loss and high signal loss especially when a call is monitored. Most of the efforts to cope with these and other problems have been directed toward the development of specialized and usually high cost components which adapt modern equipment to function in what is rapidly becoming an obsolete environment.

Accordingly, it is an object of this invention to provide new and improved operator telephone circuits.

It is another object of this invention to provide operator circuits which may be used both in connection with the standard 600 ohm office equipment and in connection with the newer 900 ohm equipment.

Another object of this invention is to provide operator circuits which do not rely upon high cost, specially designed components.

Still another object of this invention is to provide component circuits which have such general utility that they may be used in a great number of circuits and under a great number of different conditions.

In accordance with one aspect of this invention, these and other objects are accomplished by means of an operator circuit having a hybrid resistance network for connecting a two-wire talking circuit to a four-wire circuit leading to an operator headset. In each channel of the four-wire circuit is a transistorized amplifier which not only makes-up the hybrid loss but also provides a feedback that gives stability and allows the use of inexpensive, commercially available components. This hybrid network amplifier assembly is constructed as a plug-in unit so that circuits may be changed to accommodate variations in office impedance. Furthermore, the same component circuits may be plugged into any larger circuit when it is necessary to provide 2-to-4 or 4-to-2 wire conversion. For example, the plug-in component circuit may also be used to interconnect an operator circuit and a four-wire switchboard.

Moreover, through use of the above described amplifiers, it is no longer necessary to draw a substantial current while a line is being monitored. Instead, very little current is drawn so that the conversing parties are not annoyed by a click or a drop in the level of audibility when a monitor key is thrown. This small current is amplified so that the operator hears at a normal level.

The above mentioned and other objects of this invention together with the manner of obtaining them will become more apparent, and the invention itself will be best understood by making reference to the following description of an embodiment of the invention taken in conjunction with the accompanying drawings in which.

BRIEF DESCRIPTION

Figure 1:
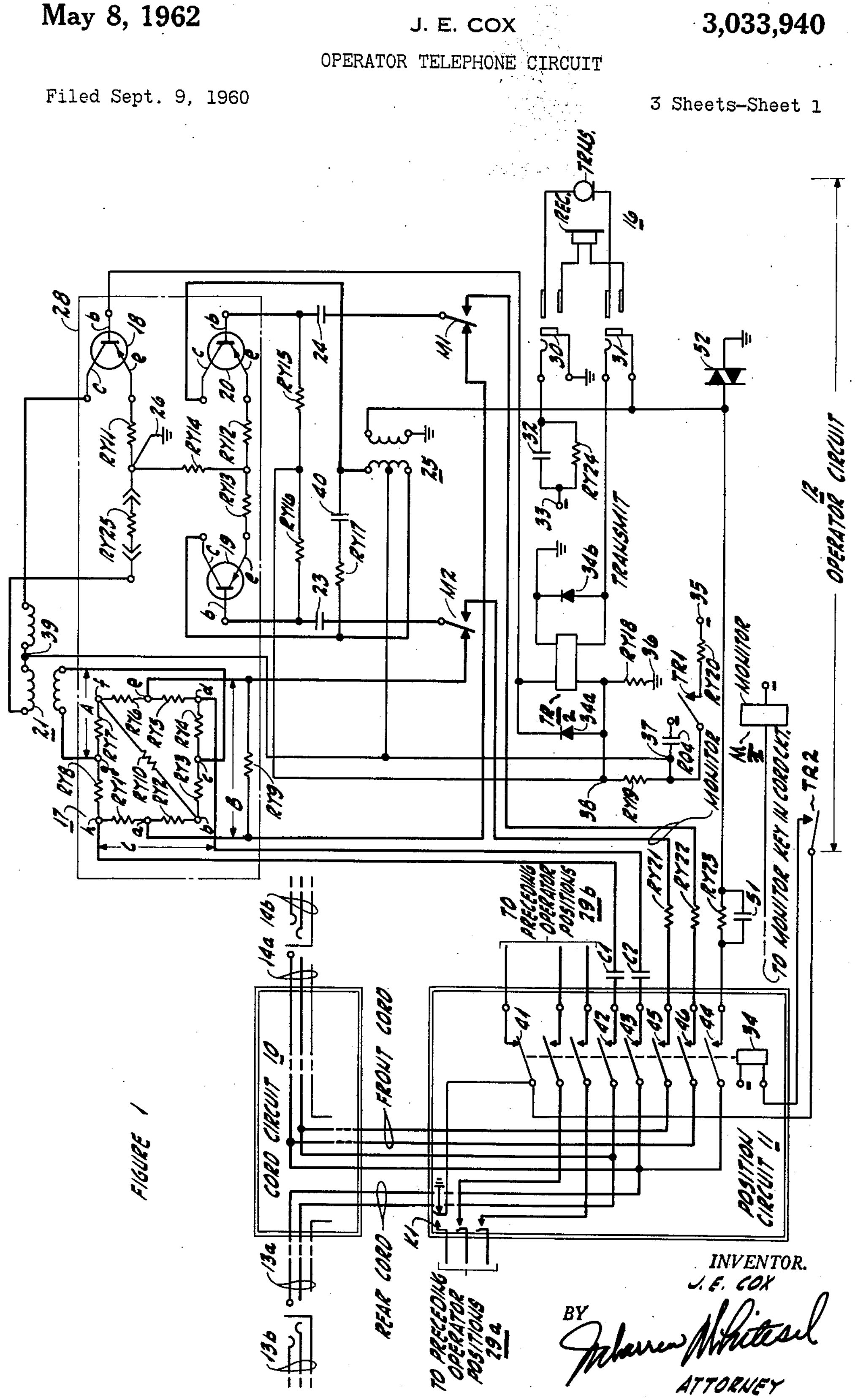
FIG. 1 is a schematic circuit diagram which shows the details of an operator circuit.

Turning next to a general description of FIG. 1, there is shown a cord circuit 10, a position circuit 11 and an operator circuit 12. The cord circuit is of conventional design giving an operator access to a calling line via a plug terminated cord **13*a* and a jack 13*b* and access to a called line via a cord 14*a* and a jack 14*b*. The position circuit is also of conventional design giving an operator control over calls extended to her board. If an operator is at position, suitable keys are operated in the circuit 11 and calls are served thereat. If the operator is not at position, these keys are operated in another manner and calls are served from an adjacent position. The operator circuit 12 provides means for transmitting voice currents from subscriber or other telephone lines to an operator headset 16 either over the heavily inked conductors leading to plugs 13*a*, 14*a*** or over the heavily inked conductors marked "Monitor."

The major components of the operator circuit 12 include an operator headset 16, a resistance hybrid network 17, a transmit channel A including a single amplifying transistor 18 and a receive channel B including a pair of transistors 19, 20 coupled as a push-pull amplifier. Although these transistors may take any convenient form, each is here shown as PNP junction type devices connected in a common emitter configuration.

The characteristic impedance of the operator circuit may be matched to a telephone office through the use of properly chosen resistances for the hybrid network 17. Moreover, the hybrid network 17 and amplifiers 18—20 may be constructed as a plug-in unit (indicated by the dot-dashed line 28) to adapt the operator circuit to function with either 600 ohm or 900 ohm offices by the simple expedient of switching plug-in units. Or, the unit may be plugged into other circuits when 2-to-4 wire or 4-to-2 wire conversion is required.

DETAILED DESCRIPTION

Next, reference is made to the construction details of the amplifier circuits. The output or collector electrode *c* of transistor amplifier 18 is connected to the hybrid network 17 via a repeat coil 21 and the base or input electrode *b* is connected to the transmitter of the operator headset 16 via an inductive coupling across the windings of transmit relay TR. The base or control electrodes *b* of transistors 19, 20 are capacitor coupled at 23, 24 to the hybrid network 17 via monitor relay contacts M1, M2 and the output or collector electrodes *c* are inductively coupled to the operator headset 16 via a repeat coil 25.

The base biasing circuits for the various transistors include a voltage divider having resistors RY18—RY20 connected between battery 35 and ground 36 when contacts TR1 close. The capacitor RQ4 is connected to point 37 on the voltage divider and functions as a decoupling capacitor by charging when the potential at point 37 goes up and discharging when the potential goes down to prevent the amplifiers from responding to fluctuations of source voltage. The base electrode *b* of the transistor 18 is biased by the potential appearing at point 38 on the voltage divider, the biasing circuit extending through a parallel circuit including the left-hand winding of relay TR and the diode 34*a*. The base electrodes *b* of transistors 19 and 20 are biased to the point 38 through resistors RY16 and RY15, respectively.

The base to emitter bias for each of the transistors is completed to ground point 26, the emiter circuit to transistor 18 being via resistor RY11, to transistor 19 being via resistors RY13, RY14, and to transistor 20 being via resistors RY12, RY14. The electrical values of these resistors are chosen to make the emitters of the various transistors more positive than their respective bases. The presence of these resistors in the emitter biasing circuits greatly increases the input impedance of the amplifiers. Therefore, a resistor RY9 is connected across the input terminals of the amplifiers 19, 20 to match the input impedance of the amplifiers to the impedance of the hybrid network 17.

The various collectors are supplied from the negative potential point 37, the circuit to the collector of transistor 18 being completed via the right-hand winding of transformer 21. The collector of transistor 19 is supplied from point 37 via the lower half and the collector of transistor 20 is supplied via the upper half of the left-hand winding of transformer 25.

With this biasing arrangement there is a negative feedback which stabilizes the D.C. supply and the amplifier characteristics. More specifically, if the potential at point 37 becomes more negative, the bias on the various base electrodes causes a greater collector-emitter current flow. With this increased current, the IR drop across the emitter biasing resistors RY11—RY14 increases, the bias on the emitters drops, and the collector-emitter current reduces. Thus, the circuit is self-stabilizing and corrects for fluctuations of power supply. Moreover, if the gain of the amplifier tends to go up, more emitter current is drawn, the IR drop increases, and the collector-emitter current reduces to restore the amplifier gain to normal. It should be understood that a gain control may be provided to allow either a continuously variable or an incremental adjustment in the volume of the sound heard by the operator. Thus, the negative feedback provided by the voltage drop across resistors RY11—RY14 automatically controls the gain of the amplifier.

Still further, the frequency response of the amplifiers is greatly improved by the feedback, since the resistors RY11—RY14 function as emitter degeneration resistances which reduce harmonic distortion, and especially third harmonic distortion. This is because the distortions produced in the amplifiers is fed back by fluctuations of the emitter bias potential into the input of the amplifier to cancel the original distortion. In addition, there is no reactance in the resistors RY11—RY14; therefore, the response over the entire audio frequency band is uniform, thus retaining the full fidelity of the original signal.

Another advantage of the negative feedback provided by the IR drop across the emitter biasing resistors is that the transistors 18—20 and other components may be inexpensive, commercial grade devices because the negative feedback signal causes the amplifiers to make-up any hybrid loss and renders the circuit insensitive to ambient environmental changes such as fluctuations in supply voltage, temperature, etc. In fact, it has been found that this feedback control is adequate to stabilize the circuit against changes caused by the drifting characteristics occurring as components age.

Since commercial grade components are used, a wide range of component values are available and the impedance of any connecting circuits may be matched. Contrast this with the situation where specially designed components are used and a high cost, low production item is required each time that it is necessary to change an impedance.

In addition to the above described use of negative feedback to control the frequency response of the amplifier, a tone control circuit is provided in the receive channel. More specifically, the resistor RY17 and capacitor 40 are connected in series across the left-hand winding of repeat coil 25. The capacitor 40 offers a high impedance to low frequencies and a low impedance to high frequencies with the value of the capacitor chosen to pass frequencies which are higher than the upper limits of the normal voice band. Thus, the higher order harmonics resulting from the use of unmatched transistors or other commercial grade components are attenuated by the resistor RY17 and the fidelity of the speech signal remains unimpared.

Figure 2:
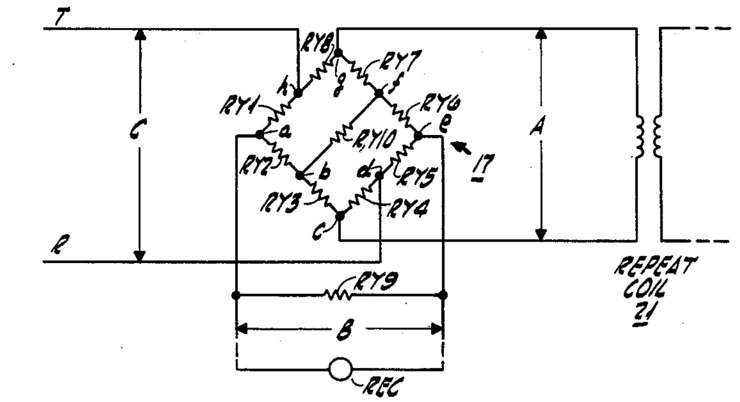
FIG. 2 shows the resistance hybrid network of FIG. 1 redrawn as a Wheatstone bridge.
Figure 3:
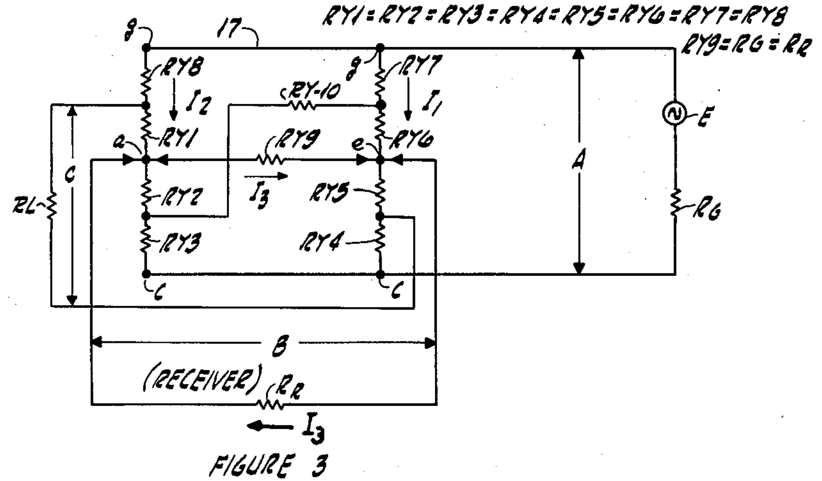
FIG. 3 is a simplified version of the Wheatstone bridge of FIG. 2 which has been redrawn to show the transmit and receive channels of a four-wire circuit.
Figure 4:
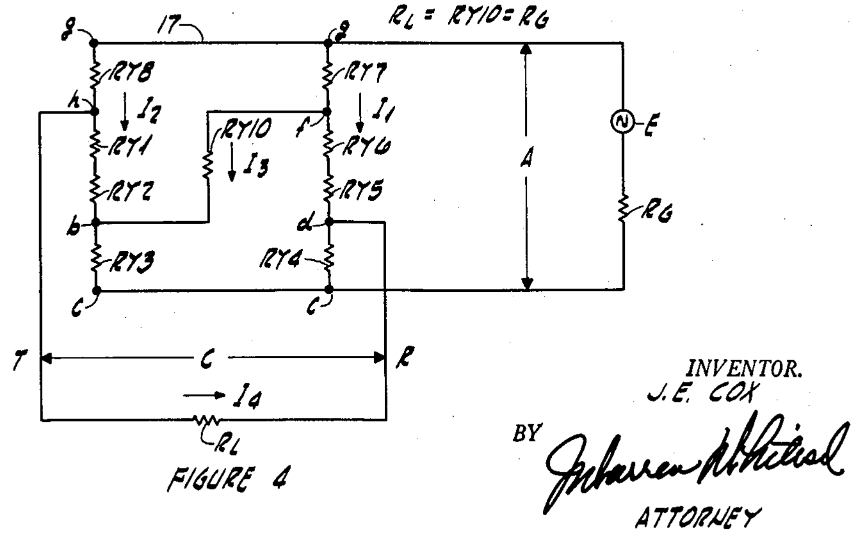
FIG. 4 is a simplified version of the Wheatstone bridge which has been redrawn to show the two-wire, two-way channel and the transmit channel of the four-wire circuit.

Next, reference is made to FIGS. 2–4 for a more complete understanding of how the hybrid circuit 17 functions. A hybrid circuit, by definition, is a combination of elements affording paths between three branches marked A, B and C in the drawings: First (Branch C) is a two-way circuit including both transmit and receive signals, second (Branch A) is a one-way transmit channel and third (Branch B) is a one-way receive channel. These three branches are arranged so that A can send to C and B can receive from C, but A and B are effectively isolated from each other; therefore, A cannot send to B.

FIG. 2 shows the hybrid circuit 17 redrawn from FIG. 1 as an analogous Wheatstone bridge. In this redrawn version, Branch A (the transmit channel) is that portion of the hybrid circuit which is connected to repeat coil 21. Branch B (the receive channel) is that portion of the hybrid circuit which is connected to the receiver "REC" of the operator's headset. And, Branch C (the two-way channel) is that portion of the hybrid circuit which is connected over the tip and ring leads T and R to the cord circuit 10 (FIG. 1).

By way of analysis, reference is made to the superposition theory which states that currents flowing in a linear network as a result of the simultaneous application of a number of voltages distributed in any manner through the network, is the sum of the component currents at any point that would be caused by the individual voltages if acting separately. Thus, the hybrid circuit 17 may be analyzed by examining the relation between currents in branches A and B separately, currents in branches A and C separately, and currents in branches B and C separately.

Pursuing this superposition principle, the Wheatstone bridge of FIG. 2 is redrawn in FIG. 3 as an equivalent circuit. In this figure, the legs of the Wheatstone bridge are arranged as parallel resistance circuits, the receiver is replaced by an equivalent resistance $R_R$, and the primary winding of the repeat coil 21 is replaced by an equivalent generator E and resistance $R_G$. Branch C is replaced by equivalent resistance $R_L$. Each of the Wheatstone bridge resistors RY1—RY8 have the same resistance. Also the balancing resistor RY10, the transmitter resistance $R_G$, the receiver resistance $R_R$ and RY9 in parallel and branch C resistance $R_L$ have the same resistance. The currents flowing through the resistors RY7 and RY8 are designated $I_1$ and $I_2$ respectively. The current, if any, flowing in the matching resistor RY9 and the receiver $R_R$ is designated $I_3$.

Also, by the superposition theory, if the receiver resistance $R_R$ and the balancing resistor RY9 are not connected into the bridge the currents $I_1$ and $I_2$ are by Ohm's law equal to the E.M.F. of the generator E divided by the total resistance of each leg, i.e.

$$I_1=\frac{E}{RY7+RY6+RY5+RY4}+\frac{E}{RY7+RY10+RY3}$$

and $$I_2=\frac{E}{RY8+RY1+RY2+RY3}+\frac{E}{RY8+R_L+RY4}$$

Since resistances RY1—RY8 are equal to each other and resistance RY10 equals resistance $R_L$, current $I_1$ is equal to current $I_2$. Thus, the potential difference between points *a* and *e* is zero because the IR drops across resistors RY7 and RY6 are equal to the IR drops across resistors RY8 and RY1, and the IR drops across resistors RY4 and RY5 are equal to the IR drops across resistors RY3 and RY2.

If it is now assumed that matching resistor RY9 and the receiver resistance $R_R$ are connected, in parallel, across points *a* and *e* no current will flow through either resistor RY9 or the receiver resistance $R_R$ since the potential difference across points *a* and *e* is equal to zero. Therefore, the electromotive force of the operator's transmitter has no effect on her receiver.

In FIG. 4 the Wheatstone bridge of FIG. 2 is redrawn as an equivalent circuit to show the relation between currents in branches A and C. Again, the repeat coil winding is shown as a generator E and a resistor $R_G$. The resistance legs of the Wheatstone bridge are shown as two separate resistance circuits, and the loop to the subscriber station is shown as resistor $R_L$. The resistance of the load across the tip and ring conductors ($R_L$) is equal to the balancing resistor RY10 and is equal to the resistance of the transmitter $R_G$. Again the currents $I_1$ and $I_2$ flow through the legs of the Wheatstone bridge while current $I_3$ flows through balancing resistor RY10, and current $I_4$ flows through the subscriber loop.

If it is assumed that balancing resistor RY10 and the loop resistance $R_L$ are not connected to the bridge the currents $I_1$ and $I_2$ are equal because the resistance of the two legs is equal. This equality of the currents $I_1$ and $I_2$ continues after the resistances RY10 and $R_L$ are connected to the bridge because these resistances are equal. The IR drop across resistor RY8 is less than the IR drops across the resistors RY7+RY6+RY5. Thus, there is a potential difference between points *h* and *d*, and current $I_4$ flows through the load resistance $R_L$ (i.e. the subscriber loop). This current $I_4$ is equal to the potential difference between the points *h* and *d* divided by the resistance $R_L$. For similar reasons, a potential difference also exists across points *b* and *f*. Therefore, a current $I_3$ flows through the balancing resistor RY10, the current value being equal to the potential difference between points *b* and *f* divided by the resistance RY10. In view of the equality of the various resistances, current $I_3$ equals current $I_4$. Thus, when the operator is speaking into her transmitter, a voice current is generated (the E.M.F. of generator E) and applied across the resistance circuits of the hybrid network to vary the current $I_4$ in the subscriber loop. In this manner, the voice currents in Branch A appear in Branch C.

The relation between the currents in Branches B and C is not shown; however, it should be understood that it is similar to the relation between the currents in Branches A and C.

In this exemplary hybrid network construction, when the operator circuit 12 is used in a 600 ohm office each of the resistors RY1—RY8 has a resistance of 425 ohms, and resistors RY9 and RY10 have a resistance of 600 ohms. If the operator circuit is used in a 900 ohm office, each of the resistors RY1—RY8 has a resistance of 635 ohms, and resistors RY9 and RY10 have a resistance of 900 ohms.

When the circuit is used in a 900 ohm office, the biasing potentials applied to the various electrodes of the transistors would not be correct; therefore, the resistor RY25 is connected between ground point 26 and the left-hand end of the upper winding of transformer 21. This resistor both soaks-up any additional power resulting from changes in resistance values of hybrid network 17 and provides a correct input impedance for Branch A of the hybrid network. It is not necessary to make any further changes in the amplifier circuits when modified for use in a 900 ohm office.

It is thought that the nature of the invention may be understood best from the following detailed description of the manner in which the circuit of FIG. 1 operates.

When the operator takes position, the key K1 is thrown to the open position shown in the drawing, thereby disconnecting the position circuit 11 from the preceding operator positions 29*a*. Also, the operator inserts a plug attached to the headset 16 into jacks 30, 31 thereby completing a transmit channel from the headset 16 transmitter "TRNS" to the hybrid network 17 via the transmit amplifier 18 and completing a receive channel from the hybrid network 17 to the headset 16 receiver "REC" via the receive amplifiers including transistors 19, 20.

Means are provided for telephonically coupling the transmitter of the operator headset to the transmit channel of the hybrid circuit via the inductive coupling between the windings of a double wound relay. More particularly, the talking battery is supplied over a circuit which may be traced from ground through the right-hand winding of the transmit relay TR, the tip of the jack 31 and associated plug, the transmitter "TRNS," the tip of jack 30, and associated plug, capacitor 32 and parallel resistor RY24 to battery 33. In this circuit resistor RY24 limits current flow and capacitor 32 acts as a filter to quiet the battery 33. Diodes 34*a*, 34*b* are connected across the windings of relay TR to prevent voltage surges from damaging transistor 18 when the operator's headset is plugged-in or removed.

Responsive to the operation of transmit relay TR, contacts TR1 close thereby energizing the voltage divider RY18—RY20 which completes the transistor collector and bias supplies, and contacts TR2 close to complete an obvious circuit for energizing relay 34 in position circuit 11.

Responsive to the operation of position relay 34, contacts 41 open to break a supervisory circuit extending to the succeeding operator positions 29*b*. Contacts 42, 43 close to extend the heavily inked talking conductors from cord circuit 10 to the operator circuit 12 via capacitors C1, C2. Contacts 44 close to complete a busy test circuit and contacts 45 and 46 close to extend a monitoring circuit from operator circuit 12 to cord circuit 10.

The voice communication path between the operator's headset 16 and the cord circuit 10 is now completed and nothing further happens until voice signals appear on the lines connected to jacks 13*b* and 14*b*, or until the operator's voice acts upon the transmitter "TRNS" of headset 16 to modulate the talking battery 33. In either event, the voice signals pass through the resistance hybrid network 17 in a direction which completes a path for carrying a conversation from a subscriber to the operator or from the operator to a subscriber, as the case may be. However, there is no transmission of signals between the transmit and receive channels A and B extending between hybrid circuit 17 and the headset 16 providing the line impedance at jack 13*b* or 14*b* matches RY10.

Incoming voice signals which appear in Branch B are applied to the base or control electrode *b* of the transistors 19, 20 via resting contacts M1 and M2. Responsive thereto, current flowing through the emitter-collector circuits *e*–*c* of transistors 19, 20 and the primary winding of repeat coil 25 are amplified. By inductive coupling across repeat coil 25, these amplified signals are applied to the receiver "REC" of headset 16. A varistor 52 is connected in the receive circuit to shunt excessive voltages to ground, thereby preventing acoustical shock to the operator.

Outgoing voice signals originating the transmitter "TRNS" are inductively coupled across the windings of relay TR to the base of transistor 18. Thereafter, the amplified currents flowing in the emitter-collector circuit *e—c* of the transistor 18 appear in Branch A of the hybrid network 17.

*Monitoring*

Means are provided for monitoring conversations extended over paths through the cord circuit without degrading the voice signals carried over such paths while allowing the operator to hear at normal levels. Basically, a monitor circuit is a connection extending from the operator headset to the talking conductors that are then carrying subscriber's voice signals. If the monitor circuit is merely connected in parallel with the subscriber's stations, the voice currents are divided by the parallel circuits. There is a sharp reduction of signal strength and consequential degrading of the voice signals.

To avoid these problems, previous monitor circuits have included specially designed, high cost hybrid coils bridged across the line, all of which caused a loss of about 10 db of signal strength and of listening qualities to the operator making it difficult to monitor on connections where the signal strength is weak.

In accordance with an aspect of this invention, the monitor circuit is connected to the subscriber lines via resistors RY21 and RY22 which sharply limit the current that is drawn from the line and raise the monitor circuit impedance accordingly. Since the resistors RY11—RY14 in the emitter circuits increase the input impedance of the transistors 19, 20, to match the impedance of the monitor circuit, there is no need for an impedance matching resistor, such as RY9 when contacts M1, M2 are closed. The advantage of this arrangement is that the monitor circuit presents a negligible input impedance during monitoring conditions.

The busy indicating circuit RY23 is disconnected in the position circuit when the plugs 13*a* and 14*a* are plugged into the jacks 13*b* and 14*b*.

Thus, to monitor a call, the operator closes a circuit (not shown) which operates monitor relay M. Responsive thereto, contacts M1 and M2 operate to switch the input circuit of the transistor amplifiers 19, 20 from its normal connection with hybrid network 17 to a connection with the monitor conductors. With this arrangement, the amplifiers provide the gain which permits reduction in current drawn from the line during monitoring with no reduction in signal received by the operator. In addition, the value of the resistors RY21 and RY22 is so high that subscribers engaged in the conversation being monitored hear no clicks or other indication that the circuit is being monitored.

*Busy Test*

To make a busy test, the operator touches the tip of a cord circuit such as 14*a* to the sleeve of an associated jack such as 14*b*. If busy tone is on the sleeve, the signal current is transmitted over the talking conductors, contacts 44, and through current limiting resistor RY23 to the receiver "REC." A contact (not shown) of a relay in the position circuit 11 disconnects this path when the plug 14*a* is fully inserted into jack 14*b*.

If the busy signal is a battery marking applied to the sleeve of jack 14*b*, the capacitor 51 charges when the operator touches the tip of the plug to the associated jack. Thus, the operator hears a click when capacitor 51 charges. The varistor 52 shunts excessive voltages to ground, thus precluding acoustical shock to the operator.

*An Operator Circuit for Use in a Four-Wire Switchboard*

In addition to the above described use as a converter between a two-wire telephone system and a four-wire operator headset, the circuit may also provide an interconnection between a four-wire headset, and a four-wire switchboard. Briefly, a four-wire switchboard is one having segregated transmit and receive channels, each completed over a two-wire metallic path. That is, a first subscriber transmits to a second subscriber over a first two-wire, one-way voice channel providing east-west communication while the second subscriber transmits to the first subscriber over a second two-wire, one-way channel providing west-east communication.

To converse with the subscribers, the operator must be able both to talk and to listen over either channel. For example, the operator talks to the second subscriber over the east-west channel and listens over the west-east channel. Conversely, the operator talks to the first subscriber over the west-east channel and listens over the east-west channel. To prevent circuit oscillation there must be no feedback between the two one-way channels. Heretofore, the operator circuit has required a pair of hybrid coils to prevent such feedback.

Figure 5:
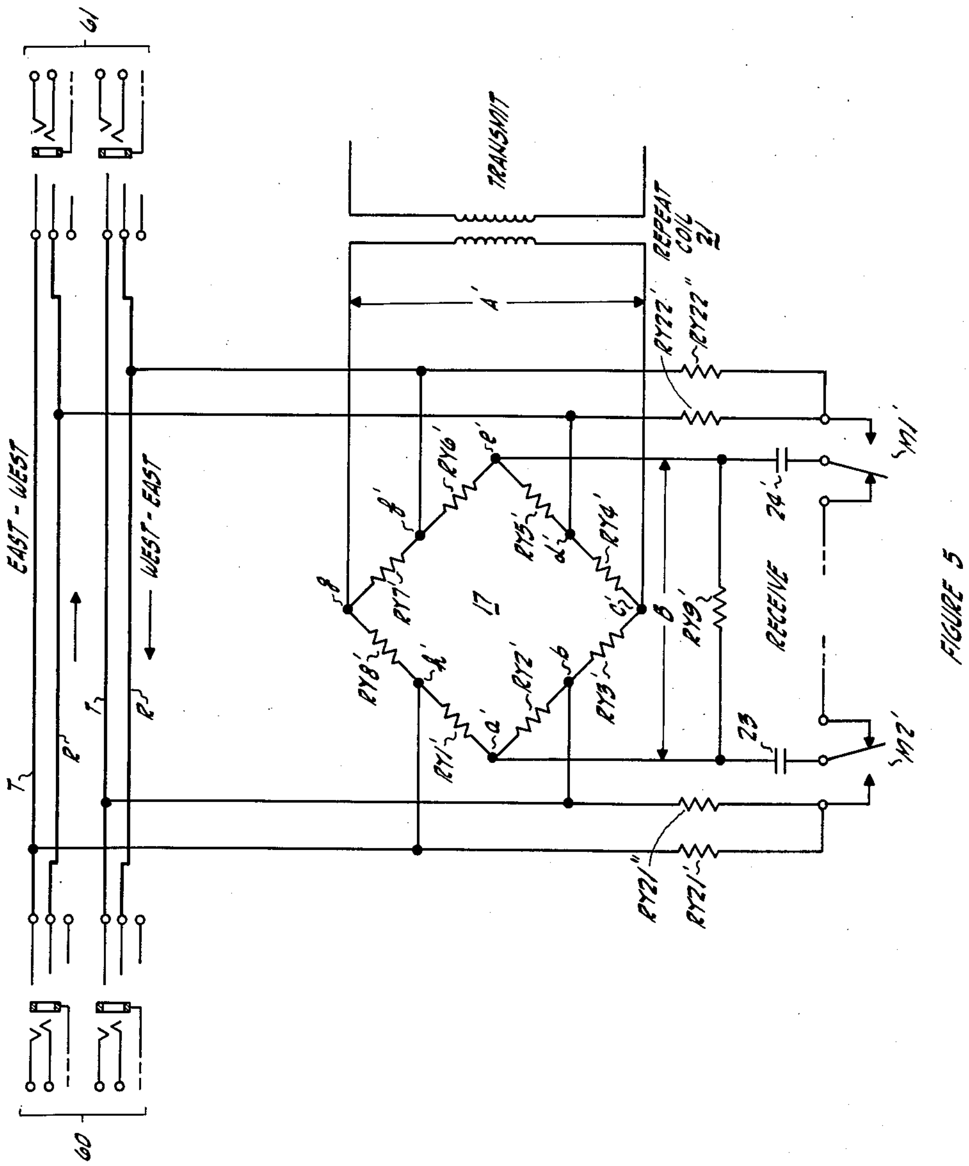
FIG. 5 is a simplified circuit diagram showing how the hybrid network is used to interconnect an operator telephone circuit and a four-wire switching arrangement.

In carrying out this invention, a single resistance hybrid network is used to interconnect the operator and the four-wire switchboard circuit. To illustrate the manner in which this is accomplished, FIG. 5 has been prepared as a simplified circuit diagram illustrating only those components necessary for an understanding of the invention. The remaining components (not shown in FIG. 5) are the same as those shown in FIG. 1. Similar reference numerals are used in FIGS. 1 and 5 to designate similar parts with a prime mark (′) added to identify those shown in FIG. 5.

When used in a four-wire system, the resistor RY10 is omitted and the second of the two one-way channels is connected in lieu thereof. More specifically, the four-wire line leading to the calling subscriber station is connected to jacks 60 while the four-wire line leading to the called subscriber station is connected to jacks 61. Thus, the east-west channel is connected across points *h′* and *d′*, while the west-east channel is connected across points *b′* and *f′* of the hybrid network 17′. Because the hybrid network is balanced, the energy in one channel of the four-wire circuit does not reach the other channel. On the other hand, the connections to the transmit channel A′ and to the receive channel B′ are displaced from the connections to the four-wire switchboard circuit by one resistor in the hybrid network; therefore, there is an unbalanced condition providing the transfer of energy that allows communication between the operator and the subscribers.

While the principles of the invention have been described in connection with specific apparatus, it is to be clearly understood that this description is made only by way of example and not as a limitation to the scope of the claims.

I claim:

1. In an operator telephone circuit, the combination comprising a two-way voice channel including a plurality of talking conductors terminated by a resistance hybrid network, said hybrid network having a characteristic impedance which matches the impedance of said two-way voice channel, an operator headset, a pair of one-way voice channels including a transmit channel and a receive channel for interconnecting said hybrid network and said headset, means in each of said one-way channels for amplifying voice currents, and means including a negative feedback circuit for stabilizing said amplifiers.

2. In an operator circuit, the combination comprising a two-way voice channel including a pair of conductors, means including a resistance hybrid network for terminating said two-way channel in its characteristic impedance, an operator headset, a pair of one-way voice channels including a transmit and a receive channel for interconnecting said hybrid network and said headset, means in each of said one-way channels for amplifying voice currents, and means including a negative feedback circuit for stabilizing said amplifier.

3. In an operator circuit, the combination comprising a pair of one-way voice channels including four wires for providing a two-way voice channel, means including a resistance hybrid network for terminating said four wires in their characteristic impedance, an operator headseat, a pair of one-way voice channels including a transmit channel and a receive channel for interconnecting said hybrid network and said headset, means in each of said channels that interconnect said hybrid network and said headset for amplifying voice currents, and means including a negative feedback circuit for stabilizing said amplifiers.

4. A telephone switchboard comprising a plurality of cord circuits, an operator circuit, and a resistance hybrid network, means including a plurality of talking conductors for extending a two-way voice channel from said cord circuits to said resistance hybrid network, an operator headset in said operator circuit, a transmit channel and a receive channel in said operator circuit for interconnecting said hybrid network and said headset, means in said transmit channel for amplifying voice currents, means in said receive channel for amplifying voice currents, each of said amplifying means comprising a transistor connected in a common emitter configuration, and means for biasing the emitters of said transistors through at least one voltage dropping resistor to provide a negative feedback which varies as a function of emitter current for stabilizing said amplifiers.

5. A telephone switchboard comprising a plurality of cord circuits, an operator circuit, a headset, means including a plurality of talking conductors for extending a two-way voice channel from said cord circuits to said operator circuit, a plug-in unit for attachment into said operator circuit, said plug-in unit comprising a hybrid network, a transmit channel, and a receive channel, said hybrid network interconnecting said two-way channel and said transmit and receive channels, means in said transmit channels for amplifying voice currents originating in said headset, means in said receive channel for amplifying voice currents received over said two-way voice channel, each of said amplifying means comprising a transistor connected in a common emitter configuration, and means for biasing the emitters of said transistors through at least one voltage dropping resistor to provide a negative feedback controlled by emitter current for stabilizing said amplifiers.

6. A telephone switchboard comprising a plurality of cord circuits, an operator circuit, and an operator headset, means for extending a two-way voice channel from said cord circuits to said operator circuit and a unit for plugging into said operator circuit, said plug-in unit comprising a resistance hybrid network, a transmit channel and a receive channel, means including said hybrid network for interconnecting said two-way channel and said headset via said transmit and receive channels, and amplifier means in both said transmit channel and said receive channel for amplifying voice currents, the impedance of said resistance hybrid network being matched to the impedance of said two-way channel whereby the characteristic impedance of said operator circuit may be changed to match the characteristic impedance of a telephone office by switching said plug-in units.

7. The telephone circuit of claim 6 wherein the resistance of the hybrid networks on some of said plug-in units is selected to match the impedance of a 600 ohm telephone office and the resistance of the hybrid networks on other of said plug-in units is selected to match the impedance of a 900 ohm telephone office.

8. A component circuit for use in a telephone system comprising a plug-in unit for interconnecting two- and four-wire transmission channels, means on said plug-in unit including a resistance hybrid network for interconnecting a two-way voice channel and a pair of one-way voice channels, the resistance of said hybrid network being selected to match the impedance of said two-way channel whereby the characteristic impedance of the circuit into which said plug-in unit is connected may be changed by switching the plug-in units, means on said plug-in unit for amplifying voice currents in each of said one-way channels, and means including a negative feedback circuit for stabilizing the output of said amplifying means against changes caused by drifting characteristics of component in said amplifying means whereby inexpensive commercial grade components may be used in said component circuit.

9. In a telephone switchboard, the combination comprising a plurality of talking conductors for interconnecting an operator circuit and cord circuits at said switchboard, a resistance hybrid network having three branches, means for coupling one of said branches to said pair of talking conductors, the characteristic impedance of said hybrid network being matched to the characteristic impedance of said talking conductors, an operator headset including a transmitter and a receiver, means for connecting a second branch of said hybrid network to a transmitter in said headset, means for connecting the third branch of said hybrid network to the receiver in said operator headset, means interposed between said transmitter and said hybrid network for amplifying voice signals originating at said transmitter, means interposed between said hybrid network and said receiver for amplifying voice signals received over said talking conductors, each of said amplifying means comprising a transistor connected in a common emitter configuration, and means comprising at least one resistor for applying biasing potential to the emitter of each of said transistors whereby increased current through an emitter causes a larger IR drop across said resistor thereby reducing the biasing potential applied to said emitter.

10. An operator telephone circuit comprising a headset having a transmitter and a receiver, a transmit channel coupled to said transmitter and a receive channel coupled to said receiver, a two-way communication channel extending to said operator circuit, means including a hybrid resistance network for interconnecting said two-way channel and said transmit and receive channels, means comprising a transistorized amplifier in said transmit channel for amplifying voice signals originating in said transmitter, means comprising a transistorized amplifier in said receive channel for amplifying voice signals received over said two-way channel, and means for stabilizing the output of said transistors comprising a negative feedback circuit for controlling the gain of said transistors, said gain being selected to compensate for loss of signal strength in said hybrid network and said negative feedback to compensate for changes in ambient environmental conditions, and for drifting component characteristics.

11. The operator telephone circuit of claim 10 and means comprising a double wound relay, said coupling between said transmit channel and said transmitter being completed by the inductive coupling across said relay windings.

12. The operator telephone circuit of claim 11 and means responsive to operation of said relay for energizing said amplifiers.

13. In a telephone switchboard, at least one cord circuit for telephonically interconnecting subscriber lines, an operator headset having at least a receiver, an operator circuit for interconnecting said cord circuit and said headset, means in said operator circuit for monitoring conversations extended over paths through said cord circuit, at least one amplifier having input and output circuits, said monitoring means including a pair of talking conductors coupled between said subscriber lines and the input circuit of said amplifier via current limiting resistors, and means for coupling the output circuit of said amplifier to said receiver of said operator headset thereby allowing the operator to hear at normal levels without degrading voice signals on said subscriber lines.

14. In an operator telephone circuit, the combination comprising a headset having a transmitter and a receiver, a transmit channel coupled to said transmitter and a receive channel coupled to said receiver, a two-way communication channel extending to said operator circuit, means including a resistance hybrid network for interconnecting said two-way channel and said transmit and receive channels, means for amplifying voice signals appearing in said hybrid network comprising an amplifier coupled between said hybrid network and said receiver, means comprising a negative feedback circuit for stabilizing the output of said amplifier, a monitor circuit including current limiting resistors, and means for switching said amplifier from said coupling with said hybrid circuit to a coupling with said monitor circuit.

15 A telephone switchboard comprising a pair of talking conductors for interconnecting cord circuits and an operator circuit, a hybrid network terminating said conductors in said operator circuit, an operator headset, a transmit channel and a receive channel for interconnecting said hybrid network and said headset, means in each of said channels for amplifying voice currents, each of said amplifying means comprising a transistor connected in a common emitter configuration, means for applying a biasing potential to the emitters of said transistors through voltage dropping resistors to provide a negative feedback circuit for stabilizing said amplifying means, a monitor circuit interconnecting said cord circuit and said operator circuit via current limiting resistors, means for switching said amplifying means in said receive channel from connection with said hybrid network to connection with said monitor circuit, and means including a current limiting resistor for transmitting busy signals from said cord circuit to said headset.

16. An operator circuit for use in a telephone system comprising a two-way voice channel for interconnecting said operator circuit and a telephone line, an operator headset, means comprising a resistance hybrid network in said operator circuit for interconnecting said two-way channel and said headset, at least one amplifier having input and output circuits interposed between said hybrid network and said operator headset, the input circuit of said amplifier being normally coupled to said hybrid network and the output circuit of said amplifier being coupled to said headset, a monitor circuit including current limiting resistors for extending voice signals between said telephone line and said operator circuit, means for switching the input circuit of said amplifier from said normal coupling with said hybrid network to a coupling with said monitor circuit, means for extending busy signals from said telephone line to said headset independently of said amplifier, and means associated with said last named means for shunting excessive voltages thereby preventing acoustical shock to the operator.

17. In a telephone system, a transmitter, a voice channel, a two-winding relay, means for supplying talking battery to said transmitter through one of said windings, and means for coupling said voice channel to the other of said windings, whereby said transmitter and said voice channel are telephonically coupled via the inductive coupling between said windings.

18. The telephone system of claim 17 and a pair of diodes, one of said diodes being connected across each of said windings.

No references cited.